US011113335B2

(12) United States Patent
Abe et al.

(10) Patent No.: US 11,113,335 B2
(45) Date of Patent: Sep. 7, 2021

(54) DIALOGUE SYSTEM AND COMPUTER PROGRAM THEREFOR

(71) Applicant: National Institute of Information and Communications Technology, Tokyo (JP)

(72) Inventors: Noriyuki Abe, Tokyo (JP); Kanako Onishi, Tokyo (JP); Kentaro Torisawa, Tokyo (JP); Canasai Kruengkrai, Tokyo (JP); Yutaka Kidawara, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 95 days.

(21) Appl. No.: 16/487,041

(22) PCT Filed: Mar. 15, 2018

(86) PCT No.: PCT/JP2018/010230
§ 371 (c)(1),
(2) Date: Aug. 19, 2019

(87) PCT Pub. No.: WO2018/169000
PCT Pub. Date: Sep. 20, 2018

(65) Prior Publication Data
US 2020/0233908 A1  Jul. 23, 2020

(30) Foreign Application Priority Data
Mar. 16, 2017 (JP) .............................. JP2017-051504

(51) Int. Cl.
*G10L 25/63* (2013.01)
*G06F 40/35* (2020.01)
*G06F 16/9032* (2019.01)

(52) U.S. Cl.
CPC ........ *G06F 16/90332* (2019.01); *G06F 40/35* (2020.01); *G10L 25/63* (2013.01)

(58) Field of Classification Search
CPC ..... G06F 16/90332; G06F 40/35; G10L 25/63
See application file for complete search history.

(56) References Cited

U.S. PATENT DOCUMENTS 9,812,151 B1 * 11/2017 Amini .................... G10L 15/26
2016/0210985 A1   7/2016 Deleeuw
(Continued)

FOREIGN PATENT DOCUMENTS

JP       2001215993 A  * 10/2001
JP       2006-071936 A    3/2006
(Continued)

OTHER PUBLICATIONS

International Search Report for corresponding Application No. PCT/JP2018/010230, dated Jun. 19, 2018.
(Continued)

*Primary Examiner* — Sonia L Gay
(74) *Attorney, Agent, or Firm* — Renner, Otto, Boisselle & Sklar, LLP

(57) ABSTRACT

A dialogue system includes a response utterance selecting unit generating a response utterance original sentence to an input utterance; an input utterance emotion estimating unit estimating emotion of the input utterance by calculating input utterance emotion scores indicating degree of matching between the emotion represented by the input utterance and a plurality of emotions; and a response utterance modifying unit for calculating response utterance emotion scores of a response utterance original sentence as emotion scores for each of the plurality of emotions, modifying the response utterance original sentence by a method of modification determined by the values of input utterance emotion score
(Continued)

and the response utterance emotion score, and thereby generating and outputting a response utterance.

7 Claims, 13 Drawing Sheets

(56) References Cited

U.S. PATENT DOCUMENTS

2017/0052971 A1    2/2017   Boyer
2017/0178005 A1*   6/2017   Kumar ................ H04M 3/5166

FOREIGN PATENT DOCUMENTS

| | | |
|---|---|---|
| JP | 2009-129405 A | 6/2009 |
| JP | 2013-109575 A | 6/2013 |
| JP | 2015-014834 A | 1/2015 |
| JP | 2016-024631 A | 2/2016 |
| JP | 2016-090775 A | 5/2016 |

OTHER PUBLICATIONS

K. Shitaoka et al., "Active Listening System for a Conversation Robot." with non-official English translation of Abstract. Document of 58th Special Interest Group on Spoken Language Understanding and Dialogue Processing. Feb. 5, 2010.pp. 61-66.

* cited by examiner

| EMOTION | SCORE | POLARITY |
|---|---|---|
| HAPPY | 0.1 | POSITIVE |
| SAD | 0.2 | NEGATIVE |
| DELIGHTED | 0.1 | POSITIVE |
| DRAINED | 0.6 | NEGATIVE |

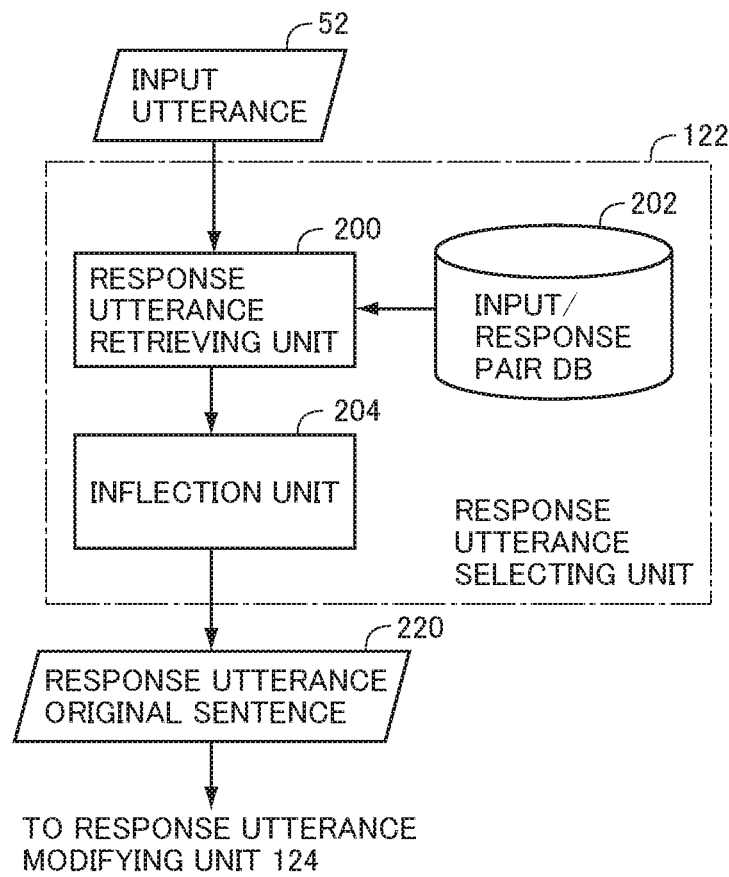

| EMOTION | PREVIOUS SCORE | SCORE | POLARITY |
|---|---|---|---|
| HAPPY | 0.2 | 0.1 | POSITIVE |
| SAD | 0.1 | 0.2 | NEGATIVE |
| DELIGHTED | 0.6 | 0.1 | POSITIVE |
| DRAINED | 0.1 | 0.6 | NEGATIVE |

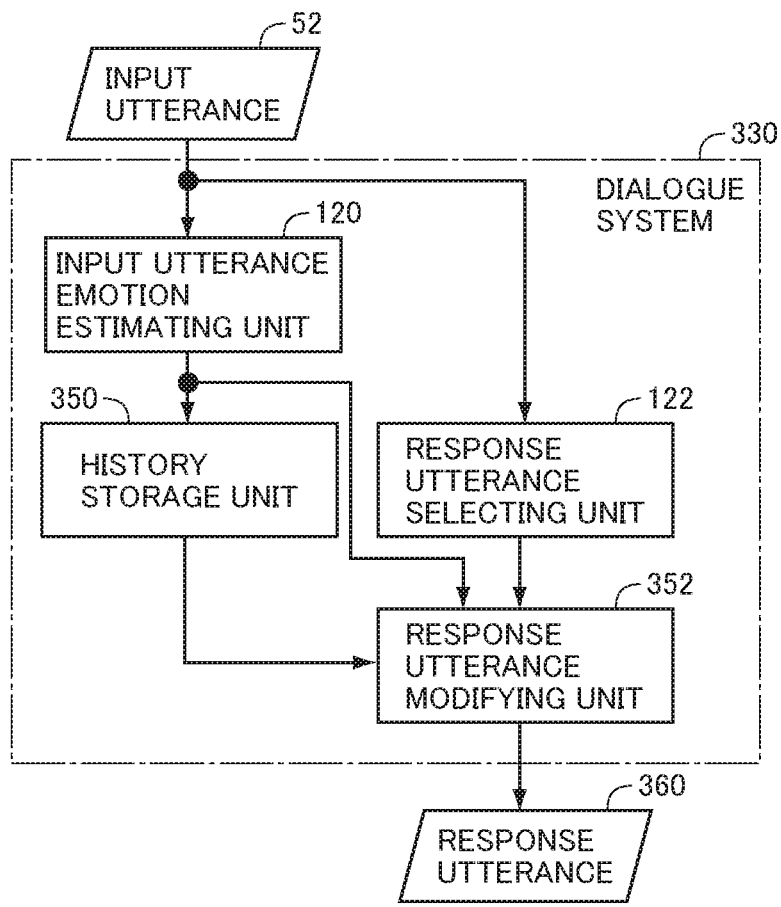

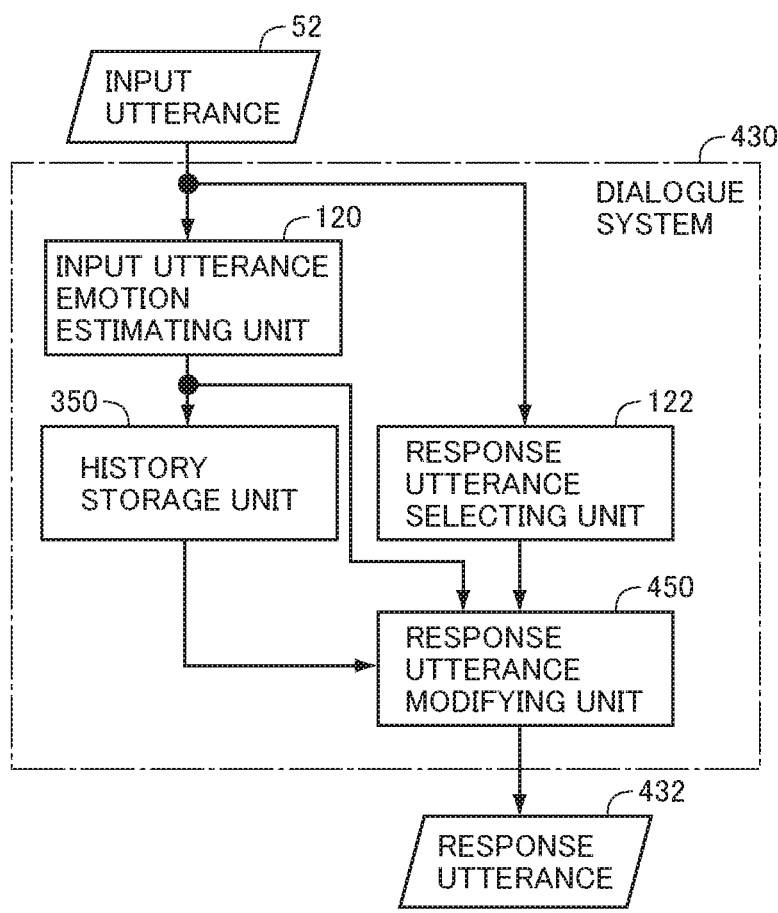

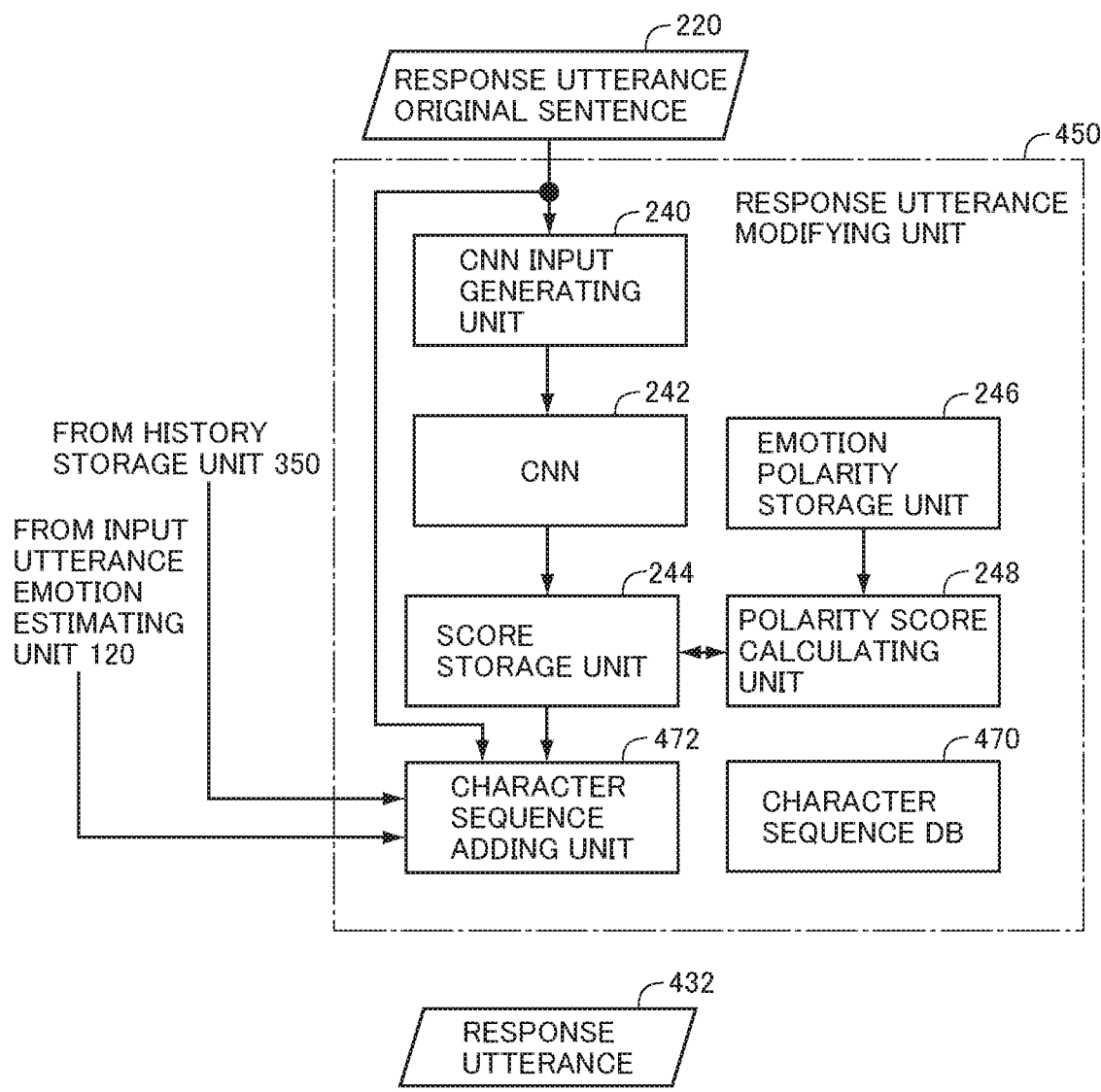

DIALOGUE SYSTEM AND COMPUTER PROGRAM THEREFOR

TECHNICAL FIELD

The present invention relates to a dialogue system using a computer and, more specifically, to a dialogue system that realizes smoother flow of dialogue by returning an appropriate response reflecting emotions of the other party (user). The present application claims convention priority on Japanese Patent Application No. 2017-051504 filed on Mar. 16, 2017, the contents of which are entirely incorporated herein by reference.

BACKGROUND ART

Dialogue systems using a computer have been put to practical use. In typical ones of such systems, emotion carried by an input utterance is estimated and a response utterance candidate that matches the estimated emotion is selected from an utterance database prepared in advance and given as a response. Further, Patent Literature 1 specified below discloses a system in which, based on the emotion of a user estimated from an input utterance, emotion of a response utterance is determined, and an utterance appropriate for the determined emotion is given, so as to make smoother the flow of dialogue. FIG. 1 shows a system configuration of such a conventional dialogue system.

Referring to FIG. 1, a conventional dialogue system 50 includes: an input utterance emotion estimating unit 70 for receiving an input utterance 52 (assumed to be text data here) and estimating the emotion of the user who gave the utterance; a response utterance emotion determining unit 72 for determining emotion of a response utterance based on the emotion estimated by input utterance emotion estimating unit 70; and a response utterance selecting/generating unit 74 for selecting, in consideration of the emotion determined by response utterance emotion determining unit 72 and contents of input utterance 52, a response utterance candidate from response utterance database (not shown) prepared in advance, and generating and outputting a response utterance 54.

CITATION LIST

Patent Literature

PTL 1: JP2015-014834 A

SUMMARY OF INVENTION

Technical Problem

In the system configuration disclosed in Patent Literature 1, response utterance emotion determining unit 72 is added between input utterance emotion estimating unit 70 and response utterance selecting/generating unit 74. With such a configuration, any existing response utterance selecting/generating process cannot directly be used, and it is necessary to configure response utterance selecting/generating unit 74 further taking into account the emotion of response utterance.

An object of the present invention is to provide a dialogue system enabling the generation of an appropriate response utterance in accordance with the emotion of input utterance in a simpler and more convenient manner utilizing an existing response utterance selecting/generating scheme.

Solution to Problem

According to a first aspect, the present invention provides a dialogue system, including: a response utterance generating means receiving an input utterance for generating a response utterance original sentence to the input utterance; an input utterance emotion estimating means for estimating emotion of the input utterance by calculating, for each of a plurality of emotions, an input utterance emotion score indicating a degree of matching between the emotion represented by the input utterance and the plurality of emotions; a response utterance emotion score calculating means for calculating, for the response utterance original sentence, a response utterance emotion score as an emotion score for each of the plurality of emotions; and a response utterance modifying means for generating and outputting a response utterance by modifying the response utterance original sentence generated by the response utterance generating means, in accordance with a method of modification determined by values of the input utterance emotion score and the response utterance emotion score.

Preferably, the response utterance modifying means includes: a character sequence storage means for storing character sequences to be added to the response utterance original sentence; and a means for selecting a character sequence from the character sequence storage means in accordance with a method of selection determined by the values of the input utterance emotion score and the response utterance emotion score, and adding the character sequence to the response utterance original sentence to generate a response utterance.

More preferably, the dialogue system further includes a history storage means for storing history of the input utterance emotion scores calculated for input utterances. The response utterance modifying unit includes a means for selecting a character sequence from the character sequence storage means in accordance with a method of selection determined by values of the input utterance emotion score, the response utterance emotion score and the input utterance emotion score of a previous input utterance stored in the history storage means, and adding the character sequence to the response utterance original sentence to generate a response utterance.

More preferably, the character sequence is a conjunction and/or a linguistic backchannel; and the character sequence storage means includes a conjunction storage means for storing contrastive conjunctions, and a backchannel storage means for storing backchannels. The response utterance modifying means includes a means for selecting a conjunction and/or a backchannel from the conjunction storage means and/or the backchannel storage means in accordance with a method of selection determined by values of the input utterance emotion score and the response utterance emotion score and for adding the selected conjunction and/or backchannel to the response utterance original sentence to generate a response utterance.

Preferably, the plurality of emotions is each classified to a first polarity or a second polarity different from the first polarity. The dialogue system further includes: a first polarity calculating means for calculating, for each of the input utterance emotion scores and the response utterance emotion scores, a first polarity score as a sum of emotion scores of the first polarity; and a means responsive to an absolute value of difference between the first polarity score of the input utterance and the first polarity score of the response utterance being equal to or smaller than a threshold value, for adding an expression representing agreement to the response utterance.

According to a second aspect, the present invention provides a computer program that causes a computer to function as various means of any of the apparatuses described above.

BRIEF DESCRIPTION OF DRAWINGS

FIG. 4 illustrates pieces of information stored in an emotion polarity storage unit shown in FIG. 3.

FIG. 5 is a block diagram showing a schematic configuration of a response utterance selecting unit shown in FIG. 2.

FIG. 8 shows examples of input utterance emotion scores.

FIG. 10 shows relations between emotions and corresponding backchannels.

FIG. 11 is a block diagram showing a schematic configuration of a dialogue system in accordance with a second embodiment of the present invention.

FIG. 15 is a block diagram showing a schematic configuration of a dialogue system in accordance with a third embodiment of the present invention.

FIG. 16 is a block diagram showing a schematic configuration of a response utterance modifying unit shown in FIG. 15.

FIG. 17 shows contents stored in character sequence database (DB) shown in FIG. 16.

DESCRIPTION OF EMBODIMENTS

Figure 1:
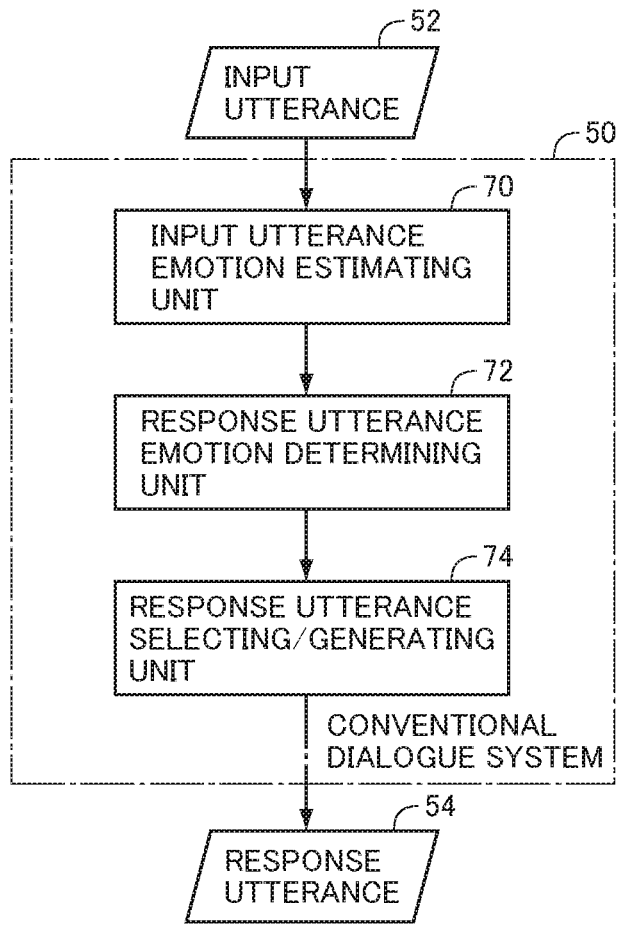
FIG. 1 is a block diagram showing a schematic configuration of a conventional dialogue system.

In the following description and in the drawings, the same components are denoted by the same reference characters. Therefore, detailed description thereof will not be repeated.

First Embodiment

<Configuration>

Figure 2:
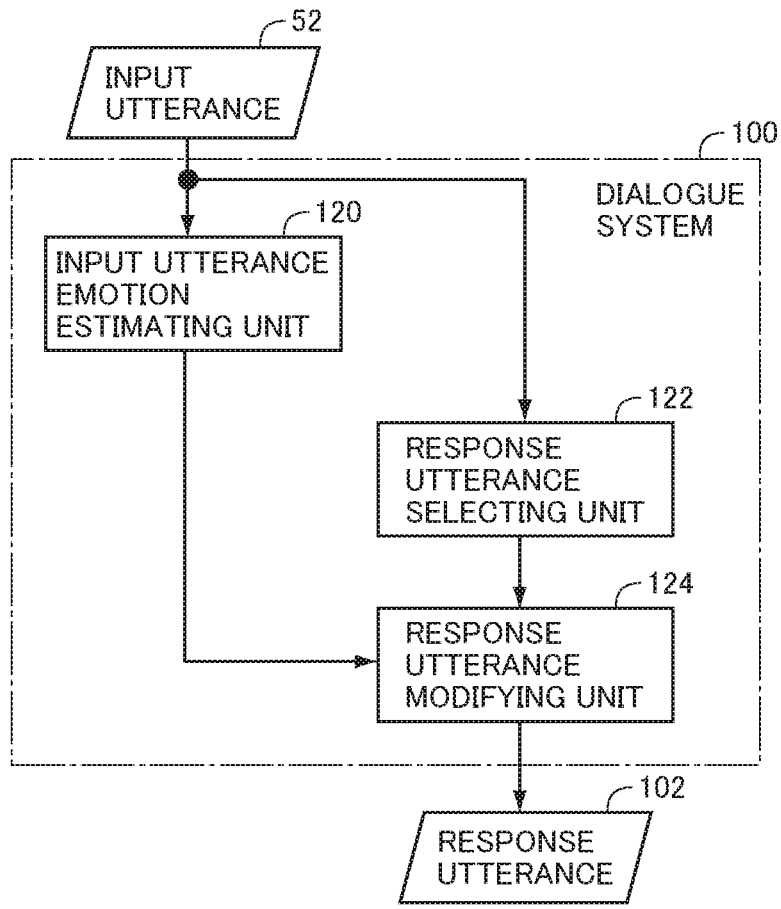
FIG. 2 is a block diagram showing a schematic configuration of a dialogue system in accordance with a first embodiment of the present invention.

FIG. 2 is a block diagram of a dialogue system 100 in accordance with a first embodiment of the present invention. Referring to FIG. 2, dialogue system 100 includes: an input utterance emotion estimating unit 120 for estimating emotion of a user from an input utterance 52; a response utterance selecting unit 122 for selecting a response utterance from dialogue/response database, not shown in FIG. 2, using an existing method, based on the input utterance 52; and a response utterance modifying unit 124 for modifying, by adding a conjunction or a backchannel to the response utterance selected by response utterance selecting unit 122 in accordance with the emotion estimated by input utterance emotion estimating unit 120 and thereby outputting a final response utterance 102.

Figures 3, 9:
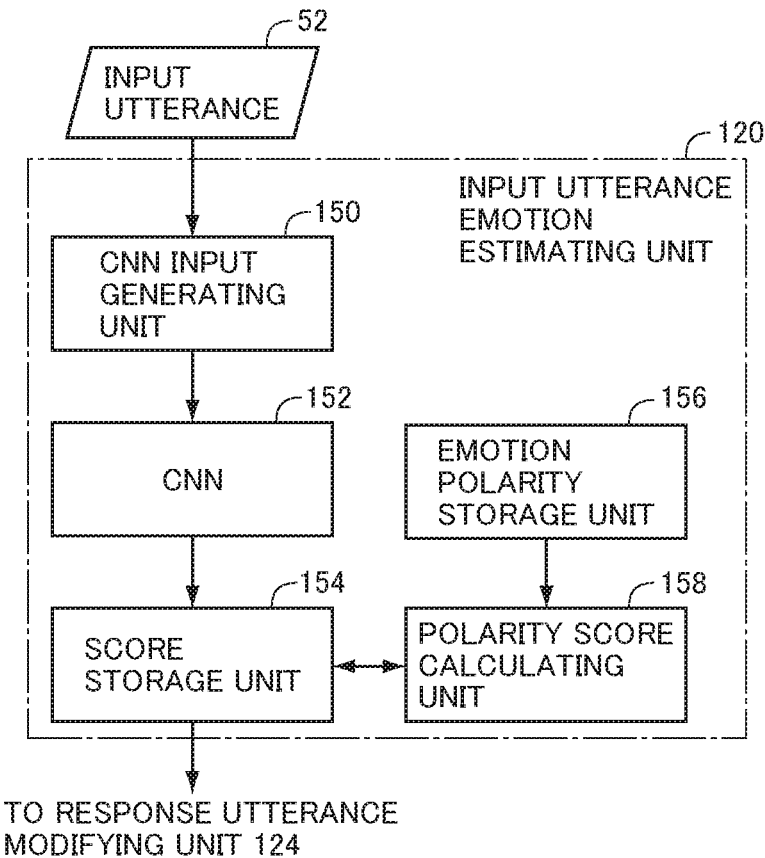
FIG. 3 is a block diagram showing a configuration of an input utterance emotion estimating unit of the dialogue system shown in FIG. 2.
FIG. 9 shows examples of response utterance emotion scores.

Referring to FIG. 3, input utterance emotion estimating unit 120 includes: a convolutional neural network (CNN) 152 trained in advance such that upon receiving a word sequence forming an input utterance 52 (actually a word vector), a score is output indicating to which degree the emotion of utterer of the input utterance 52 matches with each of a plurality of emotion items prepared in advance; a CNN input generating unit 150 for receiving the input utterance 52, modifying each of the words forming the input utterance 52 to corresponding word vectors, and thereby generating an input to CNN 152 and applying the input to CNN 152; and a score storage unit 154 for temporarily storing, for each emotion item, the scores output from CNN 152 for each emotion item. CNN 152 has the same number of outputs as the number of emotion items, and it outputs, for each emotion item, a score indicating probability that the input utterance 52 represents the emotion item. Therefore, all outputs from CNN 152 sum up to 1.

Input utterance emotion estimating unit 120 further includes: an emotion polarity storage unit 156 for storing polarities (positive or negative) of emotions represented by respective emotion items; and a polarity score calculating unit 158 for classifying the emotion items stored in score storage unit 154 to positive ones and negative ones in accordance with the corresponding polarities stored in the emotion polarity storage unit 156, calculating respective score sums and storing the sums in a score storage unit 154. Hereinafter, the sum of positive ones will be referred to as a positive value and the sum of negative ones will be referred to as a negative value and both will be referred to as a polarity score collectively.

Referring to FIG. 4, emotion polarity storage unit 156 stores polarity (positive or negative) of each of the emotion items (happy, sad, delighted, or drained). In the present embodiment, four emotion items will be described by way of example, whereas actually the items include a large number of words that are considered to represent emotions, extracted beforehand from a huge amount of documents. When emotion items in the form of words are to be classified, different forms or variations of one word may be stored as different emotion items. In the present embodiment, polarity is added manually to each emotion item. Naturally, the polarity may be determined by using a determiner prepared, for example, by machine learning.

Referring to FIG. 5, response utterance selecting unit 122 shown in FIG. 2 is an existing component, including: input/response pair database (DB) 202 storing a huge number of pairs of inputs and responses thereto collected beforehand from dialogues on the Web and from social network services; a response utterance retrieving unit 200 receiving an input utterance 52, retrieving a response utterance to the input utterance 52, and selecting and outputting the most relevant response utterance to the input utterance 52; and an inflection unit 204 adding inflection appropriate for the ongoing dialogue to the response utterance output from response utterance retrieving unit 200 and thereby generating a response utterance original sentence 220. The response utterance original sentence 220 as an output of inflection unit 204 is applied to response utterance modifying unit 124 shown in FIG. 2.

Figure 6:
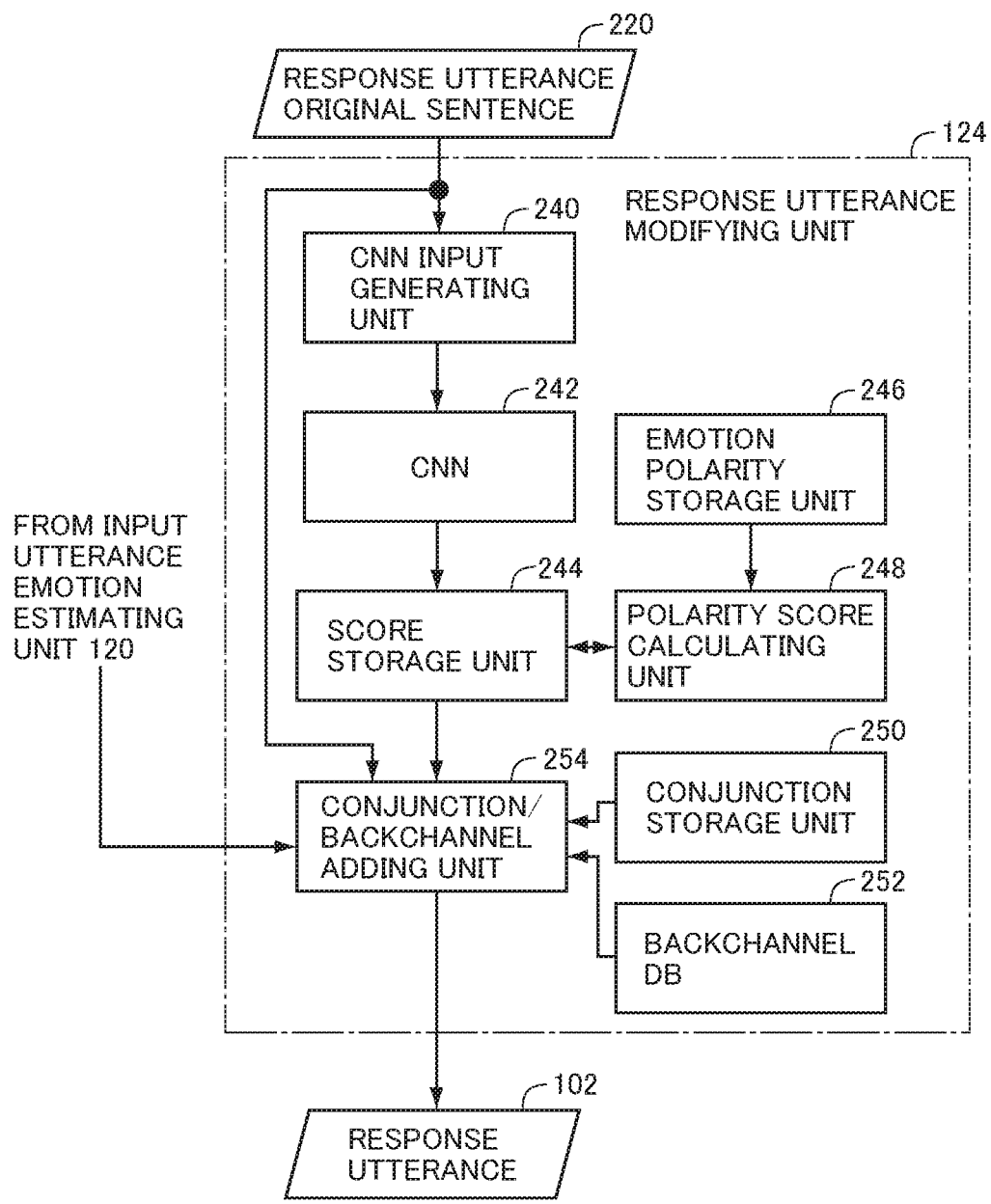
FIG. 6 is a block diagram showing a schematic configuration of a response utterance modifying unit shown in FIG. 2.

Referring to FIG. 6, response utterance modifying unit 124 includes: a CNN input generating unit 240 for receiving response utterance original sentence 220 from inflection unit 204 and generating an input to a CNN by the same method as used by CNN input generating unit 150 shown in FIG. 3; a CNN 242, identical with the CNN 152 shown in FIG. 3; and a score storage unit 244 similar to the score storage unit 154 shown in FIG. 3, for storing, for each emotion item, scores output for response utterance original sentence 220 by CNN 242.

Response utterance modifying unit 124 further includes: emotion polarity storage unit 246 and polarity score calculating unit 248, similar to emotion polarity storage unit 156 and polarity score calculating unit 158 shown in FIG. 3, for calculating a polarity score of response utterance original sentence 220 from the scores stored in score storage unit 244 and storing the result in score storage unit 244; a conjunction storage unit 250 for storing conjunctions that may possibly be added preceding a response utterance; a backchannel DB 252 for storing backchannels that may also possibly be added preceding a response utterance; and a conjunction/backchannel adding unit 254 for receiving emotion of the input utterance 52 estimated by input utterance emotion estimating unit 120 (see FIG. 2), adding an appropriate conjunction or a backchannel at the head of response utterance original sentence 220 based on the scores of respective emotion items and polarity scores output from score storage unit 244, and thereby generating and outputting a response utterance 102.

In the present embodiment, contrastive conjunctions such as "but," "however" and "nevertheless" are stored in conjunction storage unit 250. Further, in backchannel DB 252, backchannels to be added to response utterance original sentence 220 are stored for each emotion item, as shown in FIG. 10. In the present embodiment, as shown by "happy" of FIG. 10, two or more backchannels may be stored for one emotion item.

Figures 7, 12:
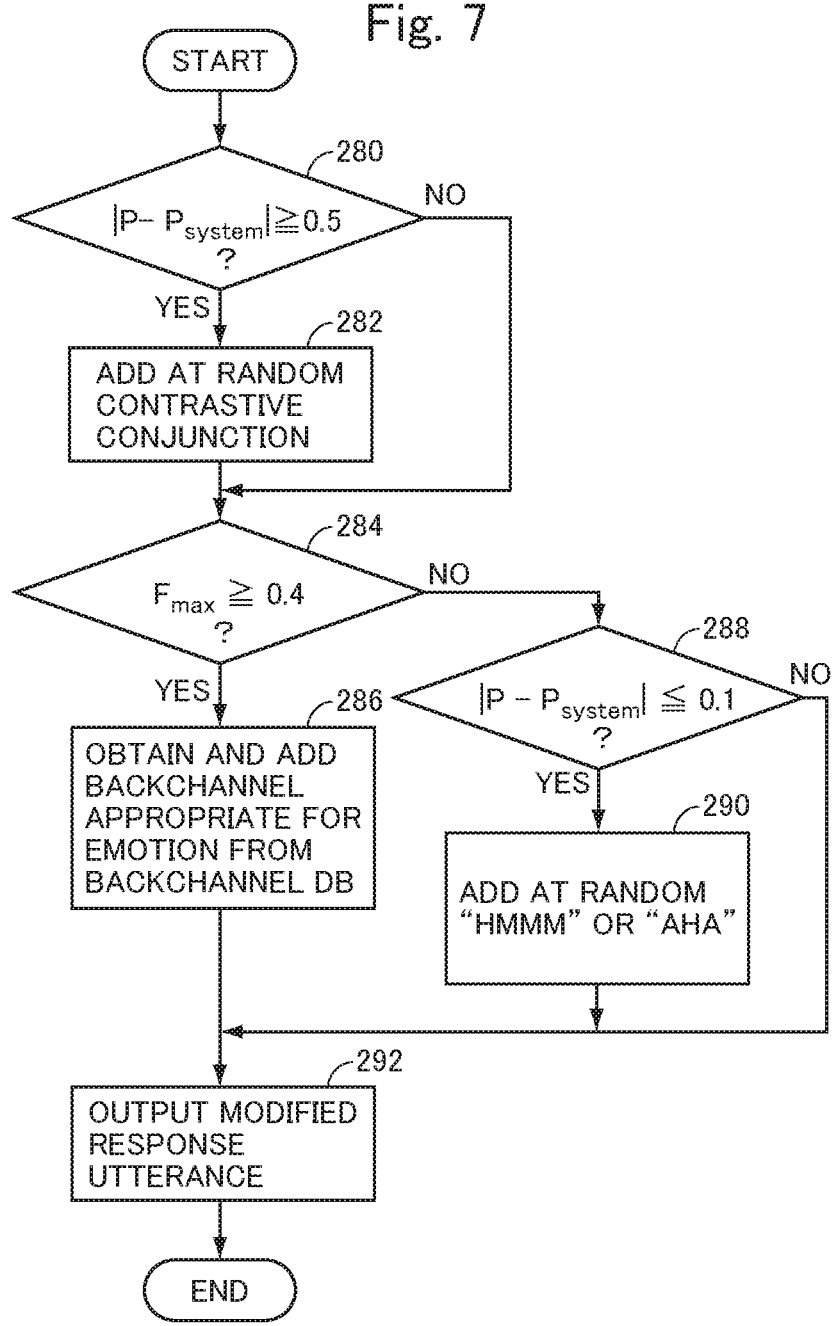
FIG. 7 is a flowchart showing a control structure of a computer program realizing a function of conjunction/backchannel adding unit shown in FIG. 6.
FIG. 12 shows emotion scores of immediately preceding input utterances and emotion scores of current input utterances.

FIG. 7 shows, in the form of a flowchart, a control structure of a computer program causing a computer to function as conjunction/backchannel adding unit 254. Referring to FIG. 7, this program includes: a step 280 of determining whether an absolute value of difference between a positive value P of input utterance 52 stored in score storage unit 154 of input utterance emotion estimating unit 120 shown in FIG. 2 and a positive value $P_{system}$ of response utterance original sentence 220 stored in score storage unit 244 shown in FIG. 6 is 0.5 or larger; a step 282 of selecting at random, if the determination at step 280 is positive, one contrastive conjunction from those such as "but," "nevertheless" and "however" stored in conjunction storage unit 250 and adding the selected one to the head of response utterance original sentence 220; a step 284, executed after step 282 or if the determination at step 280 is negative, of determining whether the maximum value of scores of respective emotion items stored in score storage unit 154 of FIG. 3 is 0.4 or larger; and a step 286 of obtaining, if the determination at step 284 is positive, a backchannel appropriate for the emotion item from backchannel DB 252 and adding it to the head of response utterance original sentence 220. If two or more backchannels are stored in backchannel DB 252 for an emotion item, conjunction/backchannel adding unit 254 of the present embodiment selects one at random from the backchannels.

The program further includes: a step 288 of determining, if the determination at step 284 is negative, whether the absolute value of difference between the positive value P of input utterance 52 and the positive value $P_{system}$ of response utterance original sentence 220 is 0.1 or smaller; a step 290 of selecting at random, if the determination at step 288 is positive, any of words such as "hmmm" and "aha" indicating that the utterance of the counterpart is heard, and adding it to the head of response utterance original sentence 220; and a step 292 executed after step 286, after step 290 or if the determination at step 288 is negative, of outputting the modified response utterance original sentence 220 as a response utterance 102.

<Operation>

Dialogue system 100 in accordance with the first embodiment described above operates in the following manner. In emotion polarity storage units 156 and 246 shown in FIGS. 3 and 6, respectively, polarities are stored for each emotion item as shown in FIG. 4. Likewise, it is assumed that CNNs 152 and 242 are trained in advance such that when a word vector of a word forming an input utterance is given, a score for each emotion item corresponding to the input utterance is output. Input/response pair DB 202 shown in FIG. 5 is built such that a huge number of input/response pairs are collected from corpora such as the Web, allowing retrieval of a response using an input as a key. Further, in conjunction storage unit 250 shown in FIG. 6, a number of contrastive conjunctions are stored, and in backchannel DB 252, one or more backchannels are stored for each emotion item.

Though word vectors are used as inputs to CNNs 152 and 242 in the present embodiment, the present invention is not limited to such embodiments and, by way of example, inputs may be given in the form of word identifier sequences.

Referring to FIG. 3, CNN input generating unit 150 converts each word forming input utterance 52 to a word vector and thereby generates an input to CNN 152, and applies it to CNN 152. In response to the input, CNN 152 outputs scores of respective emotion items stored in emotion polarity storage unit 156, of input utterance 52. The scores are stored in score storage unit 154. FIG. 8 shows an example of the scores. Polarity score calculating unit 158 classifies the emotion items stored in score storage unit 154 to positive and negative ones with reference to emotion polarity storage unit 156, calculates positive and negative values and saves them in score storage unit 154.

In the example shown in FIG. 8, the positive value is 0.1+0.1=0.2 while the negative value is 0.3+0.5=0.8. In the present embodiment, the scores are probabilities and their sum is 1 and, therefore, the sum of the positive value and the negative value also becomes 1. Naturally, the positive and negative values may be calculated by any method provided that relative difference between these can be obtained.

Referring to FIG. 5, using input utterance 52 as a key, response utterance retrieving unit 200 searches input/response DB 202 to retrieve a response utterance original sentence appropriate for input utterance 52 from input/response pair DB 202 and applies it to inflection unit 204. Inflection unit 204 adds inflection to the response utterance original sentence in accordance with the ongoing dialogue to provide a response utterance original sentence 220, which is output to response utterance modifying unit 124 shown in FIG. 6.

Referring to FIG. 6, CNN input generating unit 240 of response utterance modifying unit 124 generates word vectors to be the input to CNN 242 from response utterance original sentence 220 and applies them to CNN 242, in the similar manner as CNN input generating unit 150. In response to the word vectors, CNN 242 outputs scores of respective emotion items stored in emotion polarity storage unit 246. These scores are stored in score storage unit 244. Polarity score calculating unit 248 classifies the emotion items stored in score storage unit 244 with reference to emotion polarity storage unit 246 to positive ones and negative ones, calculates the positive and negative values and saves them in score storage unit 244.

FIG. 9 shows an example of scores calculated for a response utterance candidate stored in score storage unit 244. In this example, the positive value is 0.1+0.1=0.2, while the negative value is 0.2+0.6=0.8.

Conjunction/backchannel adding unit 254 adds a contrastive conjunction or backchannel to the head of response utterance original sentence 220 using the scores stored in score storage unit 244 and scores stored in score storage unit 154 of input utterance emotion estimating unit 120 for the response utterance original sentence 220, and outputs the result as response utterance 102, in the following manner.

Referring to FIG. 7, if the difference between the positive value P of input utterance 52 stored in score storage unit 154 and the positive value $P_{system}$ of response utterance original sentence 220 is equal to or larger than 0.5 (if the determination at step 280 is positive), one of the contrastive conjunctions stored in conjunction storage unit 250 is selected at random and added to the head of response utterance original sentence 220.

Thereafter, if the maximum value $F_{max}$ of the scores of emotion items of user utterance is equal to or larger than 0.4 (if the determination at step 284 is positive), a backchannel corresponding to the emotion item is taken out from backchannel DB 252 and added to response utterance original sentence 220 at step 286. Here, if a conjunction has been added at step 282, the backchannel is added ahead of the conjunction and, if not, the backchannel is added to the head of response utterance original sentence 220. Thereafter, response utterance original sentence 220 with such modification is output at step 292.

On the other hand, if the determination at step 284 is negative, at step 288, whether the difference between the positive value of input utterance 52 and the positive value of response utterance original sentence 220 is equal to or smaller than 0.1 is determined. If the determination is positive, it is likely that the emotion of input utterance 52 is substantially the same as the emotion of response utterance original sentence 220. In this case, either "hmmm" or "aha" is selected at random at step 290 and added to the head of response utterance original sentence 220, and the response utterance original sentence 220 thus modified is output at step 292.

As described above, according to the present embodiment, an original sentence of response utterance is selected by existing response utterance selecting unit 122 and, thereafter, a conjunction and/or backchannel selected based on the emotion and polarity scores of the utterance and on the emotion and polarity scores of the response utterance original sentence is added to the head of the response utterance original sentence and the result is output. As the response utterance selecting unit 122 shown in FIG. 2, an existing unit can directly be used, while an appropriate response utterance can be generated and output in accordance with the emotion represented by input utterance 52. By adding response utterance modifying unit 124 at the last stage of such a conventional dialogue system that selects a response utterance without taking any emotion into account, an appropriate response utterance reflecting emotion can be given.

Second Embodiment

<Configuration>

Various methods may be selected as the method of modifying the response utterance. The second embodiment is directed to one such example. In the present embodiment, emotion scores and polarity scores calculated for past input utterances are kept as history, and using the history, a response utterance is modified. Though only the history related to a directly preceding input is used in the second embodiment, older history may also be used.

Referring to FIG. 11, a dialogue system 330 in accordance with the second embodiment includes: input utterance emotion estimating unit 120 and response utterance selecting unit 122, which are the same as those shown in FIG. 2; a history storage unit 350 for storing history of scores calculated for each emotion item for input utterance 52 by input utterance emotion estimating unit 120; and a response utterance modifying unit 352 for adding a conjunction and/or a backchannel to the response utterance original sentence selected by response utterance selecting unit 122 based on the scores of input utterance 52 calculated by input utterance emotion estimating unit 120 and on the scores of the last input utterance stored in history storage unit 350, thereby modifying the response utterance original sentence and outputting the result as response utterance 360.

FIG. 12 shows an example of history of scores stored in history storage unit 350 of FIG. 11 and the history of scores obtained for the current input utterance 52. As described above, in the present embodiment, scores obtained from the directly preceding input utterance ("previous scores") and the scores obtained from the current input utterance 52 (present "scores") are used to modify the response utterance original sentence. Though not shown in FIG. 12, polarity scores of history are also used for modifying the response utterance original sentence as mentioned above. At the start of a dialogue, there is no history and, hence, emotion scores of all history are set to 0.

Figure 13:
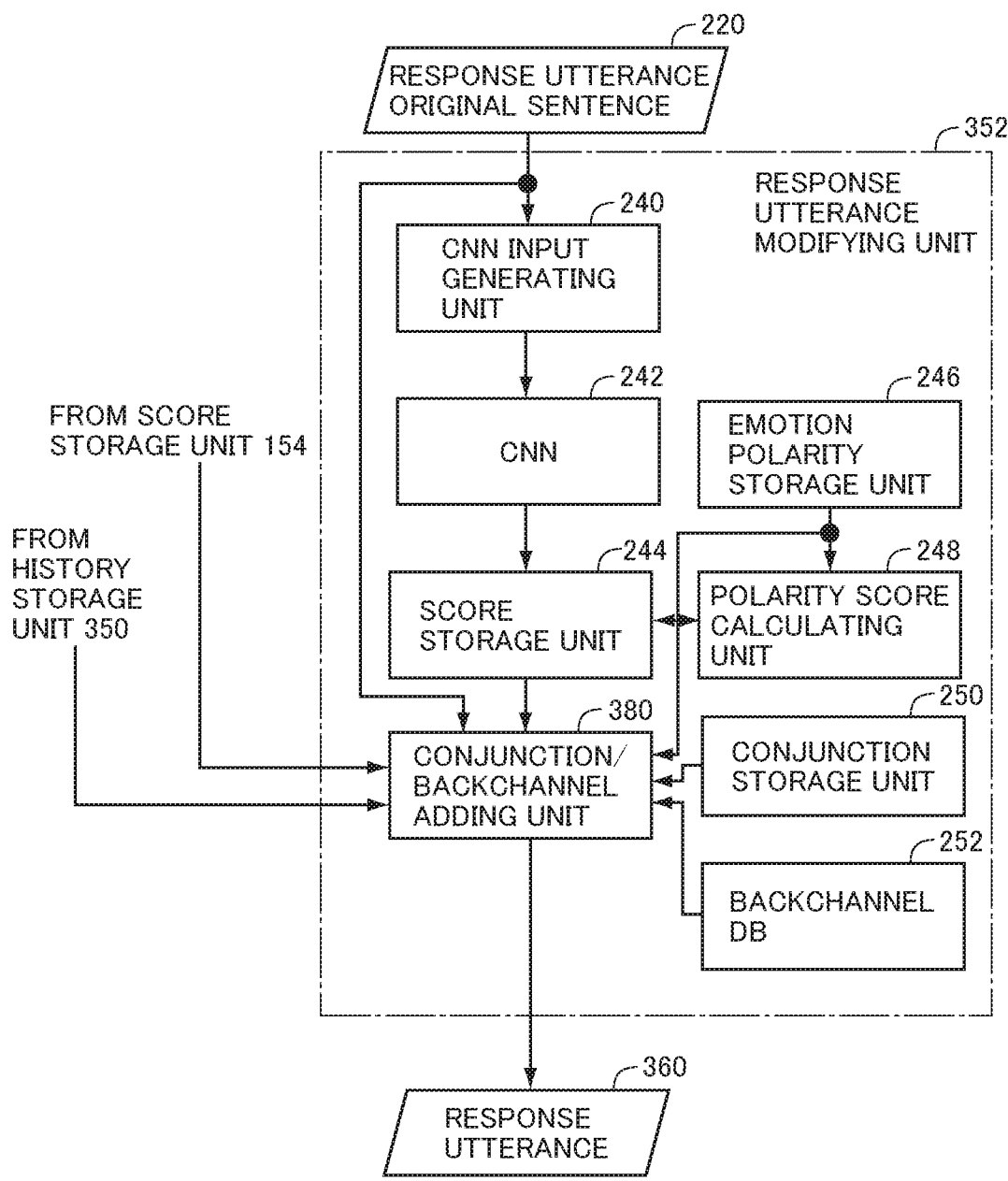
FIG. 13 is a block diagram showing a schematic configuration of a response utterance modifying unit shown in FIG. 11.

Referring to FIG. 13, response utterance modifying unit 352 has a configuration similar to response utterance modifying unit 124 shown in FIG. 6 except that it includes a conjunction/backchannel adding unit 380 in place of conjunction/backchannel adding unit 254 shown in FIG. 6. Using the emotion and polarity scores for input utterance 52 obtained by input utterance emotion estimating unit 120, emotion scores obtained from the preceding input utterance stored in history storage unit 350, and polarity scores of history calculated from the emotion scores and the emotion polarities stored in emotion polarity storage unit 246, conjunction/backchannel adding unit 380 adds a conjunction and/or a backchannel stored in conjunction storage unit 250 and backchannel DB 252 to the head of response utterance original sentence 220 and outputs response utterance 360.

Figure 14:
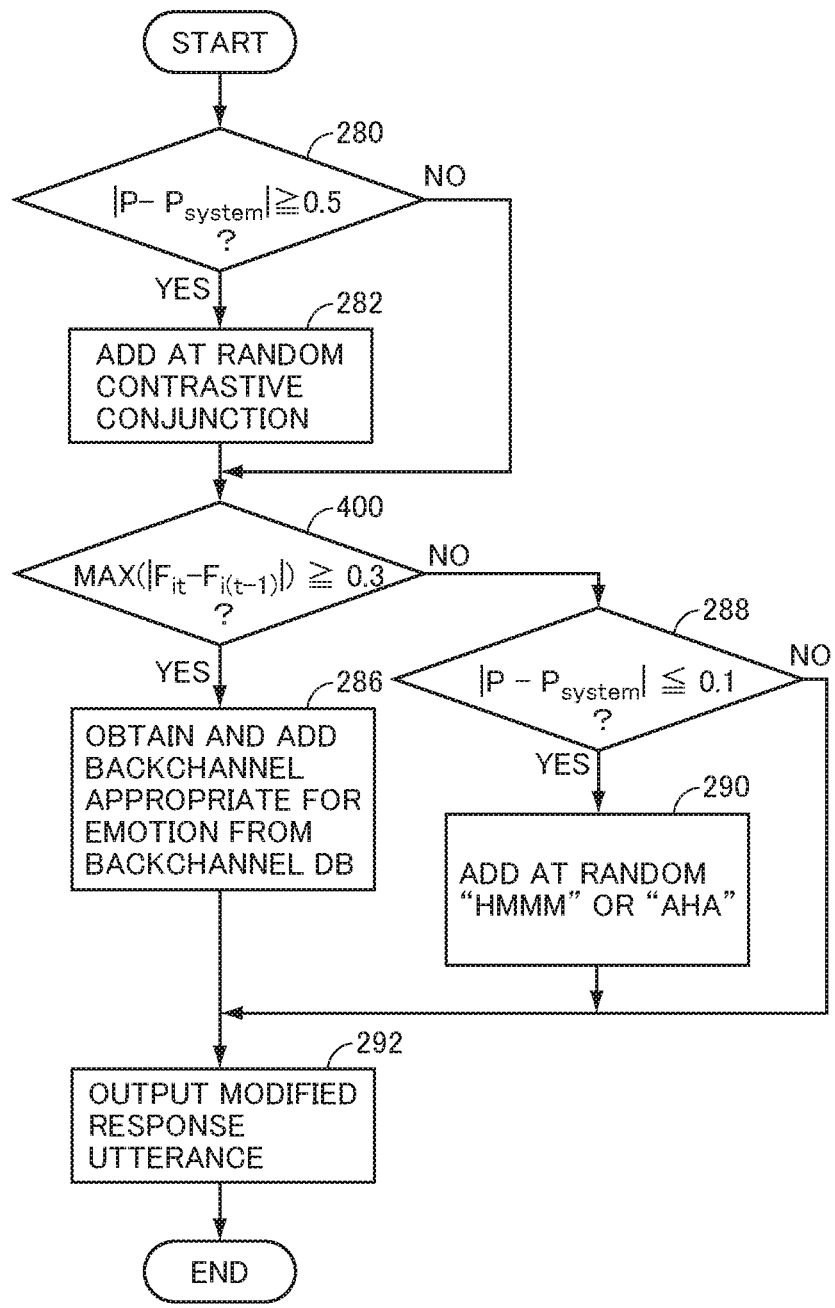
FIG. 14 is a flowchart showing a control structure of a computer program realizing a function of a conjunction/backchannel adding unit shown in FIG. 13.

FIG. 14 shows, in the form of a flowchart, a control structure of a computer program realizing conjunction/backchannel adding unit 380. Referring to FIG. 14, the program has substantially the same structure as that shown in FIG. 7, except that it includes a step 400 in place of step 284 in FIG. 7. At step 400, the maximum value of difference between the immediately preceding emotion score and the present score ($|F_{it} - F_{i(t-1)}|$, where $F_{it}$ represents the current score of the i-th emotion item, and $F_{i(t-1)}$ represents the score on the history of the same emotion item) is calculated for each emotion item, and whether the absolute value is equal to or larger than 0.3 is determined. The flow is different from that of FIG. 7 in that this step 400 is included. If the determination at step 400 is positive, the control proceeds to step 286 as in FIG. 7, and if it is negative, to step 288, as in FIG. 7.

<Operation>

In the second embodiment, as shown in FIG. 11, the emotion scores of history stored in history storage unit 350 at first are all initialized by emotion score initial values. The emotion score initial values are preferably selected to be 1.0/(the number of emotion items), so that they sum up to 1.0. When an input utterance 52 is input, input utterance emotion estimating unit 120 calculates emotion scores of input utterance 52, which are stored in history storage unit 350. The emotion scores stored in history storage unit 350 are applied to conjunction/backchannel adding unit 380 of response utterance modifying unit 352 shown in FIG. 13. Response utterance selecting unit 122 searches and retrieves a response utterance original sentence to the input utterance 52 from input/response pair DB 202 (see FIG. 5), and applies it to response utterance modifying unit 352.

Referring to FIG. 13, CNN input generating unit 240 and CNN 242 calculate emotion scores of response utterance original sentence 220 and store them in score storage unit 244. Polarity score calculating unit 248 calculates polarity scores of emotion scores stored in score storage unit 244 using the emotion polarities stored in emotion polarity storage unit 246, and saves them in score storage unit 244.

Conjunction/backchannel adding unit 380 selects a contrastive conjunction and/or a backchannel and adds it to the head of response utterance original sentence 220 in accordance with the flowchart of FIG. 14, and outputs response utterance 360. The operation of conjunction/backchannel adding unit 380 in accordance with the flowchart shown in FIG. 14 is the same as that of the first embodiment except for the determination at step 400. Therefore, detailed description thereof will not be repeated here.

According to the second embodiment, when the emotion of an input utterance changes dramatically, a backchannel reflecting the change of emotion is added to the response utterance. Viewed from the other part of dialogue, sensitive responses not only to the simple emotion of an utterance but also to the change in emotion are returned, and the flow of dialogue becomes smoother.

Third Embodiment

<Configuration>

FIG. 15 shows a configuration of a dialogue system 430 in accordance with a third embodiment of the present invention. Dialogue system 430 is different from dialogue system 330 in accordance with the second embodiment shown in FIG. 11 in that it includes, in place of response utterance modifying unit 352 shown in FIG. 11, a response utterance modifying unit 450 that modifies a response utterance by adding a character sequence to a response utterance original sentence and outputs a response utterance 432, by a method different from response utterance modifying unit 352, using the history of emotion scores stored in history storage unit 350 and emotion scores obtained from input utterance emotion estimating unit 120 with reference to input utterance 52.

Referring to FIG. 16, response utterance modifying unit 450 has a configuration similar to that of response utterance modifying unit 352 of the second embodiment shown in FIG. 13 except that it includes, in place of conjunction storage unit 250 and backchannel DB 252 shown in FIG. 13, character sequence DB 470 for storing character sequences prepared beforehand in accordance with changes in emotion, different from simple conjunctions or backchannels. Different from response utterance modifying unit 352, response utterance modifying unit 450 further includes, in place of conjunction/backchannel adding unit 380 in FIG. 13, a character sequence adding unit 472 that searches for and retrieves a character sequence to be added to response utterance original sentence 220 from character sequence DB 470 based on the history of emotion scores stored in history storage unit 350, emotion scores calculated for an input utterance 52 by input utterance emotion estimating unit 120, emotion scores obtained from response utterance original sentence 220 and polarity scores of these emotion scores, adds the retrieved sequence to the head of response utterance original sentence 220 and outputs the result as response utterance 432.

Referring to FIG. 17, in the present embodiment, the character sequences stored in character sequence DB 470 include "You might be pleased, but" and "You might be happy, but" in connection with the emotion "happy," that is, character sequences introducing contrastive utterances to the utterance of the other part. This is because the control is so structured that a response is given based on the immediately preceding utterance of the counterpart when the emotion of the counterpart changes drastically, in the character sequence adding unit 472, which will be described later. Various other methods of selecting character sequences may be possible, in accordance with the method of determination used in the character sequence adding unit 472.

Figure 18:
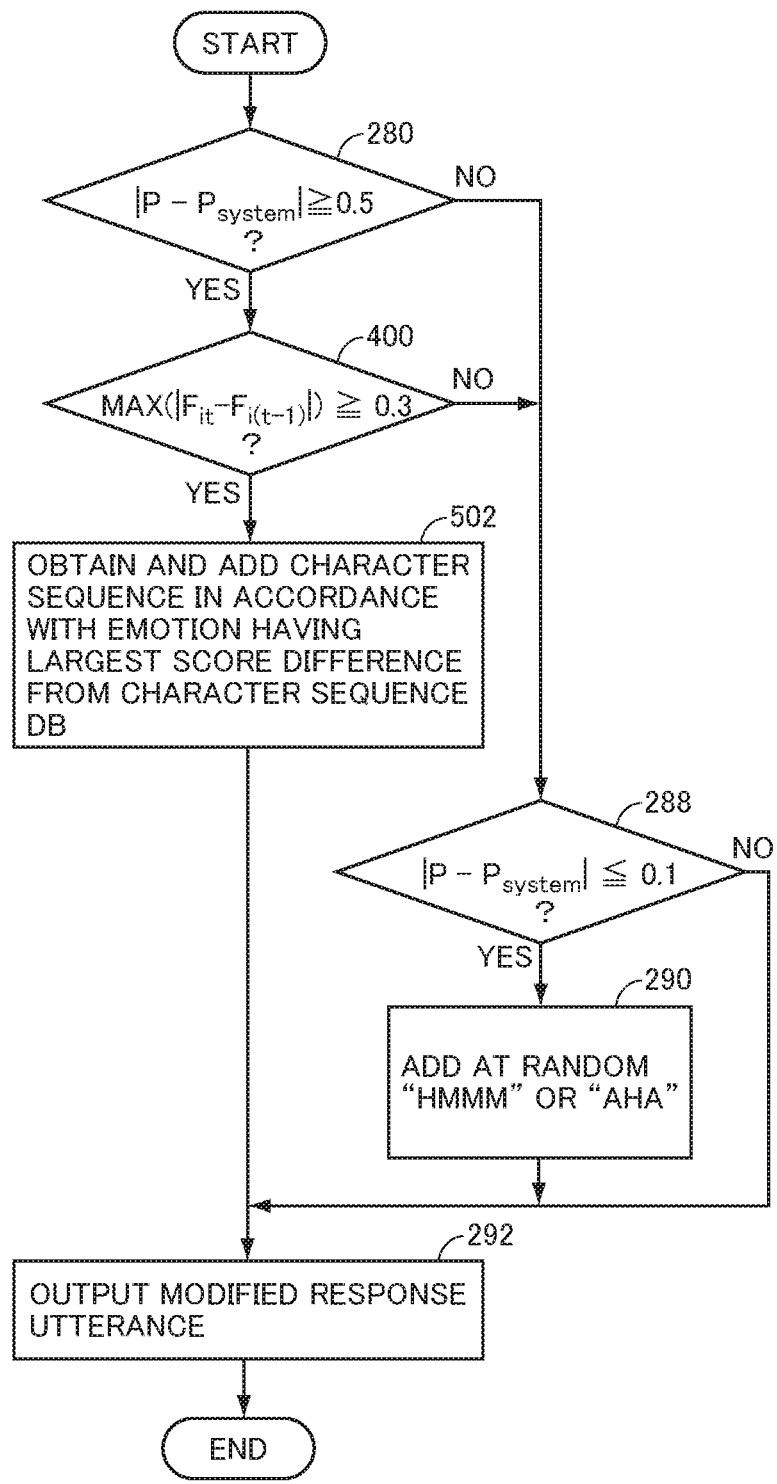
FIG. 18 is a flowchart showing a control structure of a computer program realizing a function of a character sequence adding unit shown in FIG. 16.

FIG. 18 shows, in the form of a flowchart, a control structure of a computer program realizing, by a computer, the function of character sequence adding unit 472. Referring to FIG. 18, the program has substantially the same structure as the program of the second embodiment shown in FIG. 14, except that it does not include the step 282 of FIG. 14 and that if the determination at step 280 is negative, the flow proceeds not to step 400 but to step 288. The program is different from FIG. 14 further in that it includes, in place of step 286 of FIG. 14, a step 502 executed if the determination at step 400 is positive, of obtaining and adding to the head of response utterance original sentence 220 a character sequence using that emotion of which score difference is the largest from character sequence DB 470. In the present embodiment, if the determination at steps 280 and 400 is negative, the control proceeds to step 288 and thereafter, the flow is the same as that shown in FIG. 14. After step 502, the control proceeds to step 292 as after step 286 of FIG. 14.

<Operation>

The operation of dialogue system 430 in accordance with the present embodiment is basically the same as that of the second embodiment. As can be seen from the flowchart of FIG. 18, however, if the difference between the positive value of input utterance and the positive value of system utterance is 0.5 or larger and the maximum value of difference between each emotion score of the history of input utterance and each emotion score of the current input utterance is 0.3 or larger, dialogue system 430 operates in the following manner. Specifically, in that case, in the present embodiment, at step 502, not a simple backchannel but a character sequence that corresponds to such an emotion that provides the maximum value of difference in emotion scores is selected from character sequence DB 470 shown in FIG. 17 and added to the head of response utterance original sentence 220. Here, what is added is not a simple contrastive conjunction. When the emotion of the input utterance is much different from the response utterance, a character sequence that has the same function as a contrastive conjunction and that introduces a specific response utterance is added in accordance with the emotion that is particularly different among the emotion items. Therefore, the resulting dialogue is felt natural and not mechanical.

It is possible to mix the concepts of the systems of the second and third embodiments and to generate response utterance in accordance with either one of the methods for each input utterance.

Further, it is naturally understood that the methods of determination by conjunction/backchannel adding units 254 and 380 and by character sequence adding unit 472 are not limited to those of the embodiments above. Further, what conjunction, backchannel or character sequence is to be selected and added to the response utterance in accordance with the result of determination may also be changed variously in the actual design.

The threshold values for determination at step 284 of FIG. 7 and at step 400 of FIGS. 14 and 18 change in accordance with the number of emotion items used. While it is preferable to set these values appropriately through experiments beforehand, experiments are not absolutely necessary and arbitrary values may be selected.

The present invention is particularly characterized in that it provides a scheme enabling, after a response utterance is selected by an existing method, processing of the response utterance by using emotion scores of the input utterance. When the response utterance is to be modified in accordance with the emotion of input utterance, it is unnecessary to change the method of selecting the response utterance, and an appropriate response utterance can be generated easily in accordance with the emotion of input utterance independent from the method of selecting the response utterance.

[Computer Implementation]

Figure 19:
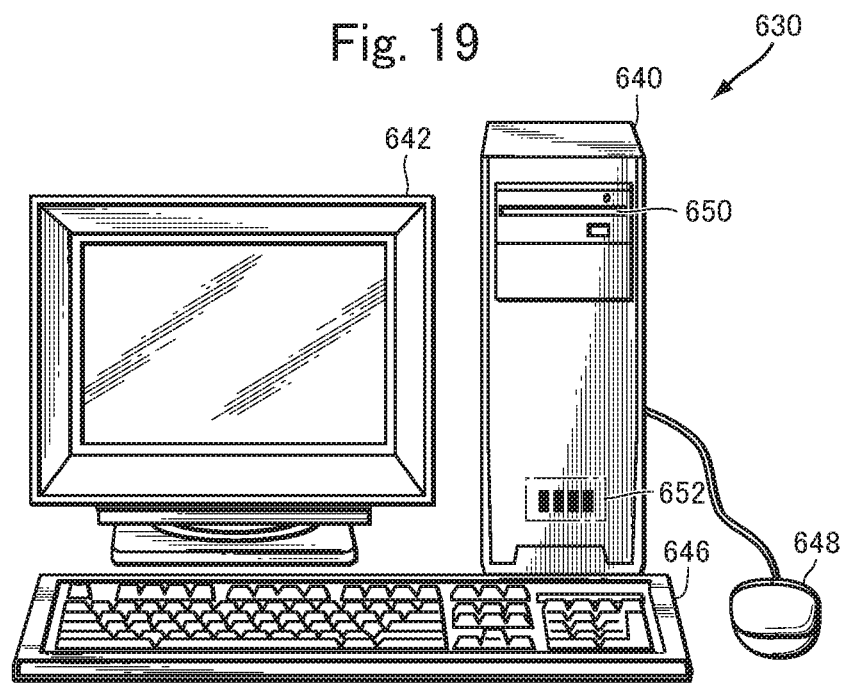
FIG. 19 shows an appearance of a computer realizing the response utterance modifying unit of each of the embodiments of the present invention.

Dialogue systems 100, 330 and 430 in accordance with the embodiments of the present invention and the components thereof can be implemented by computer hardware and computer programs executed on the computer hardware. FIG. 19 shows an appearance of the computer system 630 and FIG. 20 shows an internal configuration of computer system 630.

Referring to FIG. 19, computer system 630 includes a computer 640 having a memory port 652 and a DVD (Digital Versatile Disk) drive 650, a keyboard 646, a mouse 648, and a monitor 642 all connected to computer 640.

Figure 20:
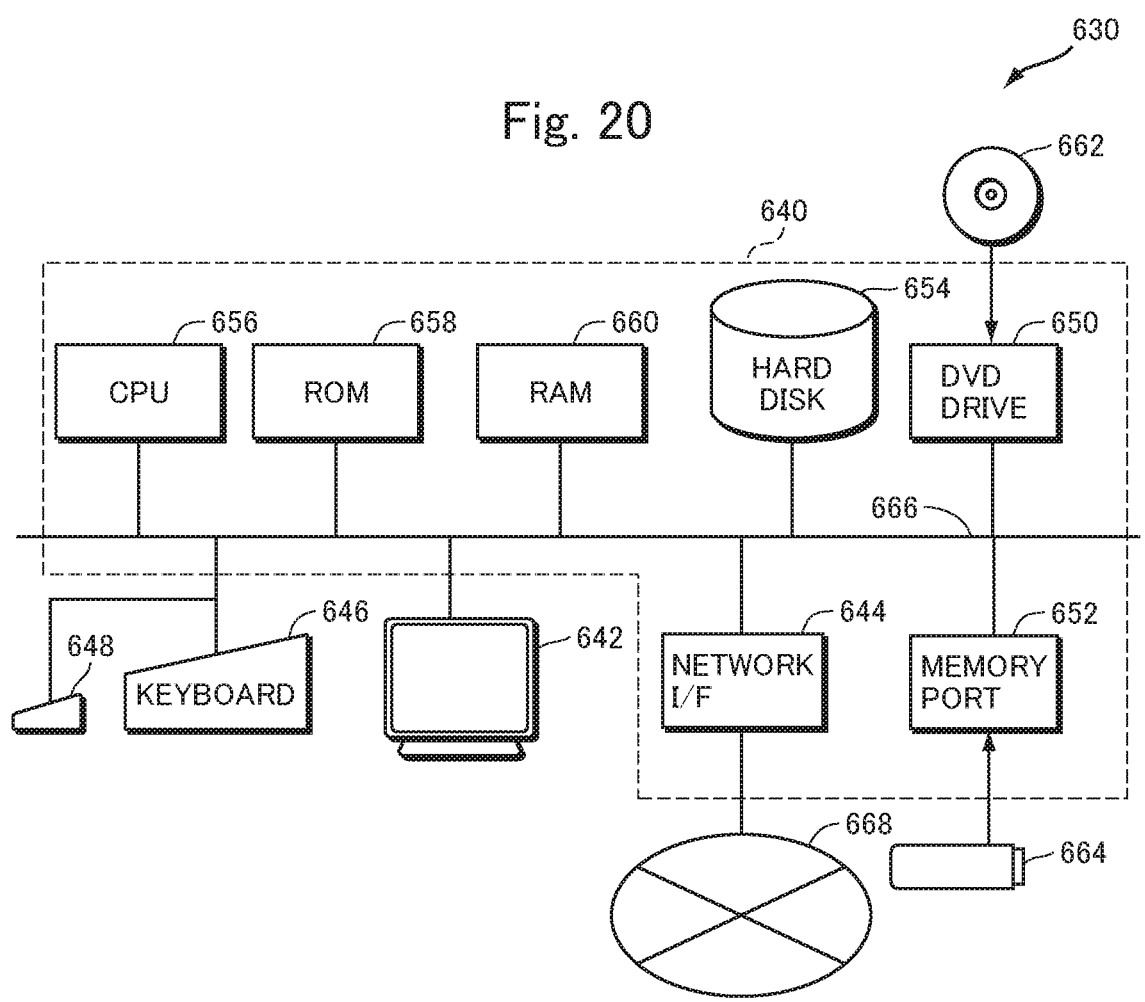
FIG. 20 is a block diagram showing a hardware configuration of the computer shown in FIG. 19.

Referring to FIG. 20, computer 640 includes, in addition to memory port 652 and DVD drive 650, a CPU (Central Processing Unit) 656, a bus 666 connected to CPU 656, memory port 652 and DVD drive 650, a read only memory (ROM) 658 storing a boot-up program and the like, a random access memory (RAM) 660 connected to bus 666, storing program instructions, a system program and work data for realizing functions of various units of dialogue systems 100, 330 and 430, and a hard disk 654. Computer system 630 further includes a network interface (UF) 644 providing the connection to a network 668 allowing communication with another terminal.

The computer program causing computer system 630 to function as each of the functioning sections of the dialogue systems 100, 330 and 430 in accordance with the embodiments above is stored in a DVD 662 or a removable memory 664 loaded to DVD drive 650 or to memory port 652, and transferred to hard disk 654. Alternatively, the program may be transmitted to computer 640 through network 668, and stored in hard disk 654. At the time of execution, the program is loaded to RAM 660. The program may be directly loaded from DVD 662, removable memory 664 or through network 668 to RAM 660.

The program includes a plurality of instructions to cause computer 640 to operate as functioning sections of the dialogue systems 100, 330 and 430 in accordance with the embodiments above. Some of the basic functions necessary to cause the computer 640 to realize each of these functioning sections are provided by the operating system running on computer 640, by a third party program, or by various programming tool kits or dynamically linkable program library, installed in computer 640. Therefore, the program may not necessarily include all of the functions necessary to realize the system and method of the present embodiment. The program has only to include instructions to realize the functions of the above-described system by dynamically calling appropriate functions or appropriate program tools in a program tool kit or program library in a manner controlled to attain desired results. Naturally, all the necessary functions may be provided by the program only.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to any industry in which providing an answer to a question is useful, including science, technology, education, manufacturing and services.

REFERENCE SIGNS LIST 50, 100, 330, 430 dialogue system
52 input utterance
54, 102, 360, 432 response utterance
70, 120 input utterance emotion estimating unit
72 response utterance emotion determining unit
74 response utterance selecting/generating unit
122 response utterance selecting unit
124, 352, 450 response utterance modifying unit
150, 240 CNN input generating unit
152, 242 CNN
154, 244 score storage unit
156, 246 emotion polarity storage unit
158, 248 polarity score calculating unit
200 response utterance retrieving unit
202 input/response pair DB
204 inflection unit
220 response utterance original sentence
250 conjunction storage unit
252 backchannel DB 254, 380 conjunction/backchannel adding unit
350 history storage unit
470 character sequence DB
472 character sequence adding unit

The invention claimed is:

1. A dialogue system, comprising a processor configured to:
receive an input utterance and generate, as a response utterance original sentence, a response to the input utterance;
estimate emotion of said input utterance by calculating, for each of a plurality of emotions prepared in advance, an input utterance emotion score indicating a degree of matching between the emotion represented by said input utterance and the plurality of emotions;
calculate, for said response utterance original sentence, a response utterance emotion score as an emotion score for each of said plurality of emotions; and
generate and output a response utterance by modifying the response utterance original sentence based on values of said input utterance emotion score and said response utterance emotion score, such that:
when the response utterance emotion score and the input utterance emotion score indicate a similarity between an emotion of the response utterance and an emotion of the input utterance, the response utterance original sentence is modified to denote the similarity between the emotion of the response utterance and the emotion of the input utterance; and
when the response utterance emotion score and the input utterance emotion score indicate a dissimilarity between the emotion of the response utterance and the emotion of the input utterance, the response utterance original sentence is modified to denote the dissimilarity between the emotion of the response utterance and the emotion of the input utterance.

2. The dialogue system according to claim 1, further comprising a memory for storing character sequences to be added to said response utterance original sentence, wherein
the processor is further configured to select a character sequence from the memory based on the values of said input utterance emotion score and said response utterance emotion score, and add the character sequence to said response utterance original sentence to generate a response utterance.

3. The dialogue system according to claim 2, wherein
the memory additionally stores history of said input utterance emotion scores calculated for input utterances;
the processor is further configured to select a character sequence from the memory based on values of said input utterance emotion score, said response utterance emotion score and said input utterance emotion score of a previous input utterance stored in said memory, and add the character sequence to said response utterance original sentence to generate a response utterance.

4. The dialogue system according to claim 2, wherein
said character sequence is a conjunction and/or a backchannel;

the memory stores contrastive conjunctions, and backchannels; and
the processor is further configured to select a conjunction and/or a backchannel from said memory based on values of said input utterance emotion score and said response utterance emotion score, and to add the selected conjunction and/or backchannel to said response utterance original sentence to generate a response utterance.

5. The dialogue system according to claim 1, wherein
the plurality of emotions is each classified to a first polarity or a second polarity different from the first polarity;
the processor is further configured to:
calculate, for each of said input utterance emotion scores and said response utterance emotion scores, a first polarity score as a sum of emotion scores of the first polarity, and
responsive to an absolute value of a difference between the first polarity score of said input utterance and the first polarity score of said response utterance being equal to or smaller than a threshold value, add an expression representing agreement to said response utterance.

6. A non-transitory, computer readable medium having stored thereon a computer program causing a computer to function as the dialogue system according to claim 1.

7. A dialogue system, comprising a processor configured to:
receive an input utterance and generate, as a response utterance original sentence, a response to the input utterance;
estimate emotion of said input utterance by calculating, for each of a plurality of emotions prepared in advance, an input utterance emotion score indicating a degree of matching between the emotion represented by said input utterance and the plurality of emotions, wherein the plurality of emotions is each classified to a first polarity or a second polarity different from the first polarity;
calculate, for said response utterance original sentence, a response utterance emotion score as an emotion score for each of said plurality of emotions;
generate and output a response utterance by modifying the response utterance original sentence based on values of said input utterance emotion score and said response utterance emotion score,
calculate, for each of said input utterance emotion scores and said response utterance emotion scores, a first polarity score as a sum of emotion scores of the first polarity, and
responsive to an absolute value of a difference between the first polarity score of said input utterance and the first polarity score of said response utterance being equal to or smaller than a threshold value, add an expression representing agreement to said response utterance.

* * * * *